July 28, 1953   W. M. LACEY   2,647,227
DRY-PLATE RECTIFIER
Filed Jan. 28, 1949

INVENTOR.
William M. Lacey
BY
Attorney

Patented July 28, 1953

2,647,227

UNITED STATES PATENT OFFICE 2,647,227

DRY-PLATE RECTIFIER

William M. Lacey, Medford, Mass., assignor to Sylvania Electric Products Inc., a corporation of Massachusetts Application January 28, 1949, Serial No. 73,246

14 Claims. (Cl. 317—241)

1

The present invention relates to dry-plate rectifiers, and is concerned especially with the physical arrangement of the parts for excellent performance characteristics while affording economy in manufacture, and saving of space when wired into circuit applications.

Dry-plate rectifiers have heretofore been used widely and certain characteristics have come to be recognized as essential to satisfactory operation. In selenium rectifiers particularly, the free and extensive exposure of the rectifier plates to cooling air or the like is needed to dissipate the destructive heat generated in the rectifier. A single rectifier plate comprising a carrier electrode, a layer of carefully processed selenium, and a counter electrode on the selenium, with an electroformed barrier layer between the counter electrode and the selenium, can withstand a back-voltage of the order of 30 volts and will pass current in a forward direction substantially in proportion to the area of the plate.

In order to withstand high back-voltage, selenium rectifier plates have commonly been stacked, with washers separating the plates to provide space for ventilation so that the counter electrode of one plate is connected by a washer to the carrier of the next.

In accordance with the present invention a new arrangement of plates is provided that eliminates many of the parts required in prior-art series-connected rectifier assemblies and provides more effective cooling that reduces the operating temperature and improves rectification efficiency. In practising the present invention, rectifier plates are arranged in successive overlapping relation, with gripping means arranged laterally along the series-connected overlapping plates. The accompanying drawings show several illustrative forms of the invention, which are described in detail in the following description of the illustrated embodiments. From these, various features of the invention will be understood and readily appreciated.

2

Figure 1:
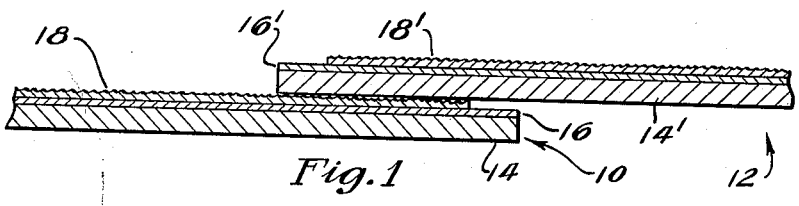
Fig. 1 is an enlarged sectional view of a pair of plates arranged in overlapping relation in accordance with the present invention.

In Fig. 1 a pair of rectifier plates 10, 12 are shown connected in series, the rectifier plates themselves constituting all of the required electrical circuit except for the terminals. Each plate includes a carrier electrode 14, 14', a layer of selenium 16 or 16' processed in accordance with known techniques, and a counterelectrode 18 or 18". A barrier layer is believed to be formed electrically between counterelectrode 18 and semiconductor electrode 16. The barrier layer and the selenium constitute a rectifying layer. Counterelectrode 18, 18' is usually terminated short of the edges of the plate so as to avoid short-circuits across layer 16, 16'. The contact between the exposed surface of counterelectrode 18 and the opposite surface of carrier electrode 14' directly provides a series connection between two rectifier plates so as to enable the two plates to withstand a voltage applied between plate 14 and counterelectrode 18' that is equal to substantially double that of a single rectifier plate. The current passed by the entire area of the selenium is conducted in the plane of the counterelectrode to the carrier electrode of the next contacting plate.

In the region where the two plates are overlapped, more heat is developed than elsewhere due to the passage of current through two selenium layers. Were the temperature allowed to rise excessively, the rectifying properties of the plates would degenerate, and the plates might deteriorate permanently. But because the carrier electrode is formed of a good heat conductor such as of sheet-aluminum, the heat generated in the overlap regions is distributed to areas of the plates that are exposed for efficient dissipation. The overlap area should be restricted to a relatively small fraction of the total plate area for most effective ventilation.

Figure 3:
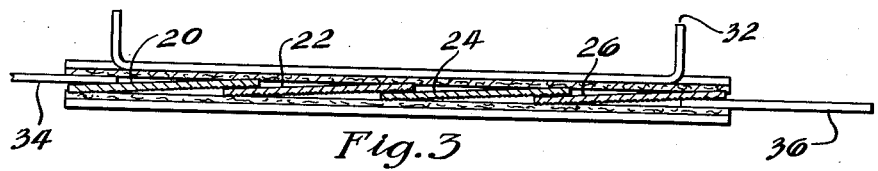
Fig. 3 is a cross-sectional view along the line 3—3 of the rectifier in Fig. 2.
Figure 2:
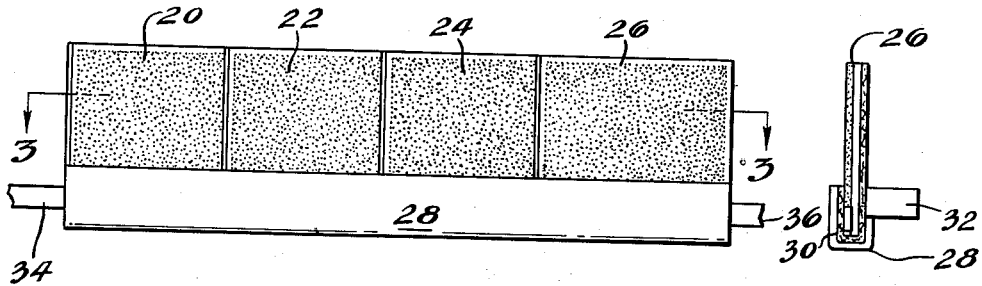
Figs. 2 and 4 are front and end elevations, respectively, of a four-plate rectifier in accordance with the present invention.
Figure 4:
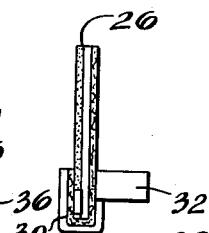

In Figs. 2 to 4 inclusive a rectifier is shown embodying the edge-overlap arrangement in Fig. 1. The entire assembly provides a mechanical construction that is of special merit from the manufacturing viewpoint because it lends itself to simple assembly and requires only a limited number of parts. A series of plates 20, 22, 24 and 26 are shown in edge-overlapped relation, with the counterelectrode of the first plate in contact with the carrier electrode of the next, in sequence, so that the assembly is capable of withstanding approximately four times the back-voltage that one will withstand. (In these figures, the counterelectrode is represented by the stippled surface, and by rough lines in the cross-sectional views.) By restricting the extent of overlap to a small fraction of the plate area, the heat-dissipation of the plate is found to be at least equal to a stack of plates secured together mechanically but spaced apart by conductive washers connecting each plate to the next in series.

Along the lateral edge of the series of plates a mechanical clamp is provided, the lateral edge being that which crosses the overlapped edges. In the form of rectifier in Figs. 2 to 4, a metal channel 28 is provided, clamping each plate against the next. Metal channel 28 is insulated from all of the plates by a layer 30 of impregnated paper or other suitable insulating material. This paper extends over one face of plates 20 to 26 to insure insulation from a metal chassis in the event that the rectifier is mounted close to the chassis in its circuit application. In the areas not enclosed by channels, the paper should be perforated liberally to promote cooling of the plates. For securing the rectifier as a unit to the chassis in which it is to be used, lugs 32 are provided, struck out of channel 28. These lugs can be projected through holes in the chassis and the projecting lug portions then are to be bent or twisted to hold the rectifier firmly in place.

Channel 28 resiliently enforces contact between plates 20 and 22 in their overlap region, at least along the bottom or lateral edge, and likewise insures mechanical and electrical connection between plates 20 and 22, between plates 22 and 24, and between plates 24 and 26. Metal terminals 34 and 36 are also pressed by channel 28 and the intervening paper insulator 30 against plates 20 and 26 respectively, the thickness of terminals 34 and 36 being appropriate to a tight fit.

The entire assembly is mechanically and electrically stable and it affords extensive cooling surface for efficient operation and long life. The assembly as illustrated is normally coated by dipping into insulating waterproofing paint for protecting the plates against atmospheric moisture and this further promotes mechanical stability. Aside from the plates themselves and the necessary terminal strips to which circuit connection is made, it is notable that only the single insulated channel 28 is required.

In order to assemble this strip rectifier the four plates are held loosely in desired overlapping relation and against insulating sheet 30 that is folded over one edge of the plates; and channel 28 is then forced across the lateral edges of the plates.

Figure 5:
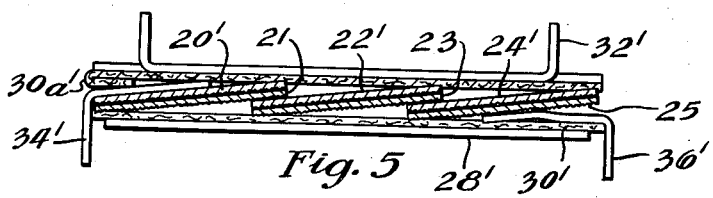
Figs. 5 and 6 are cross-sectional views of other forms of dry-plate rectifiers, these figures being comparable to Fig. 3.

The overlap and the direct-contact between the plates are features of the rectifier in Figs. 2 to 4, and of the other forms of plate rectifier in Figs. 4 and 5. In Fig. 4 metal channel 28', provided with mounting lug 32' and insulating sheet 30' grips a series of six plates 20', 21, 22', 23, 24' and 25, the plates being inclined in relation to the channel. Plates 21 and 22' are in limited overlapping edge contact and plates 23 and 24' are similarly held in overlapping edge contact. Pairs of plates 20' and 21, 22' and 23, and 24' and 25 are shown in full overlapping relationship, an arrangement which somewhat reduces the current-handling capacity of the plates per unit of area but which greatly increases the back-voltage rating without correspondingly increasing the overall length of the strip-rectifier. The sloping arrangement of plates is mechanically stable, being sustained at the ends by appropriate forming of terminals 34' and 36', sheet 30' being doubled at 30a' for more firmly securing terminal 34' in its place in the assembly.

Figure 6:
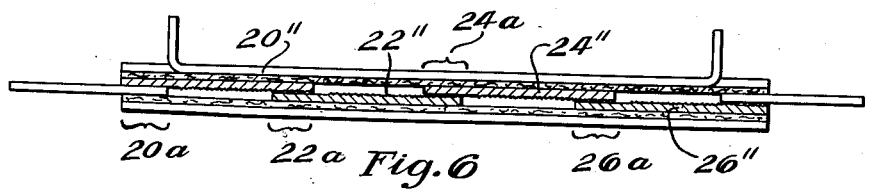

In Fig. 6 another edge-overlap arrangement of rectifier plates is shown having the merit in common with the form of Fig. 2 of efficient heat-dissipation due to large and effectively exposed surfaces of the rectifier plates; and the further merit of direct connection between each plate and the next without increase in the number of parts required, such as where a separate connector from each plate to the next is required. In the form of plate-rectifier in Fig. 6 the sloping relationship of the plates with respect to the paper insulation is avoided. In order to achieve this result, however, a portion of plate 26" opposite bracket 26a is required to be bare of semi-conductor and counterelectrode, this arrangement being characteristic of the other plates 20", 22" and 24" as well. The arrangement in Fig. 6 is of excellent mechanical stability, and avoids concentration of stress by the squared edges of the plates against the insulation. However it requires larger carrier electrodes and occupies a greater overall length than the forms of rectifier in Figs. 2 to 4.

Various other rectifiers embodying various features of the foregoing rectifiers, having plates connected in series and arranged in a strip, will occur to those skilled in the art; and for this reason the appended claims should be allowed such broad interpretation as is commensurate with the spirit and scope of the invention.

What is claimed is:

1. A dry-plate rectifier comprising multiple plates each having a counterelectrode, a carrier electrode, and an intervening rectifying layer, said plates being series-connected with the counterelectrode of one plate overlapping the carrier electrode of the next plate repeatedly in sequence, the area of overlap of each contact being restricted to a small fraction of the total rectifying area of any of the plates.

2. A dry-plate rectifier comprising a series of rectangular plates each having a sheet-metal carrier electrode, a counterelectrode, and a rectifying layer interposed between said electrodes, said plates being arranged in a strip and including one plate having only a small portion of its counterelectrode at one edge in contact with the carrier electrode of one adjoining rectifier plate and having only a small portion of its carrier electrode at the opposite edge in contact with the counterelectrode of another adjoining rectifier plate.

3. A dry-plate rectifier comprising a series of substantially flat rectangular plates each having a sheet-metal carrier electrode, a counterelectrode substantially coextensive with said carrier electrode, and an interposed rectifying layer, said plates being connected in series with the rear surface of each plate in physical contact with the front surface of the next, the area of each contact being limited to less than half of the area of any one plate.

4. A dry-plate rectifier comprising multiple plates each having a sheet-metal carrier electrode, a counterelectrode virtually coextensive with said carrier electrode, and an intervening rectifying layer, said plates being series-connected in overlapping edge relationship, the overlapping edges being gripped together at one end thereof by an insulating channel extending across all said plates.

5. A dry-plate rectifier comprising multiple rectangular plates each having a sheet-metal carrier electrode, a counterelectrode, and an intervening rectifying layer, said plates being connected in series and arranged in sequence with opposite ends in overlapping contact, the contact area being limited to a small part of the total rectifying area of each plate, and the lateral edges of all the plates being gripped to maintain the overlapping contact by an insulated channel.

6. A dry-plate rectifier comprising multiple rectangular plates each having a substantially flat sheet-metal carrier electrode, a counterelectrode, and an interposed rectifying layer, said plates being connected in series electrically and having the counterelectrode of one plate overlapping that carrier-electrode surface of the next plate that is opposite its counterelectrode, so that the individual plates slope in relation to the series of plates, a parallel-walled gripping device along an edge of the series of plates to maintain said overlapping contact, and terminal connectors gripped between each of the end plates of the series and said parallel-walled device.

7. A strip rectifier comprising a series of rectifier plates having a sheet-metal carrier electrode, a counterelectrode, and an intervening rectifying layer, said plates being arranged in series electrically and mechanically, with opposite edges of all but the end plates of the series in overlapping relation, the extent of overlap being limited to a minor part of the rectifying area of each plate, and a gripping device in engagement with the series of plates along one edge thereof, said rectifier being coated with a mechanically stabilizing waterproofing coating.

8. A rectifier according to claim 1 wherein the rectifying layer is largely selenium.

9. A rectifier according to claim 2 wherein the rectifying layer is largely selenium.

10. A rectifier according to claim 3 wherein the rectifying layer is largely selenium.

11. A rectifier according to claim 4 wherein the rectifying layer is largely selenium.

12. A rectifier according to claim 5 wherein the rectifying layer is largely selenium.

13. A rectifier according to claim 6 wherein the rectifying layer is largely selenium.

14. A rectifier according to claim 7 wherein the rectifying layer is largely selenium.

WILLIAM M. LACEY.

References Cited in the file of this patent

UNITED STATES PATENTS

| Number | Name | Date |
|---|---|---|
| 2,134,131 | Kipphan | Oct. 25, 1938 |
| 2,486,110 | Bugel et al. | Oct. 25, 1949 |
| 2,498,890 | Kotterman | Feb. 28, 1950 |
| 2,510,588 | Kotterman | June 6, 1950 |

FOREIGN PATENTS

| Number | Country | Date |
|---|---|---|
| 584,115 | Germany | Sept. 15, 1933 |